(12) United States Patent
Ono et al.

(10) Patent No.: US 6,585,419 B2
(45) Date of Patent: Jul. 1, 2003

(54) SHAFT BEARING MEMBER

(75) Inventors: Akira Ono, Aichi (JP); Satoshi Imai, Aichi (JP); Hiroichi Matsuhisa, Aichi (JP); Seiji Mori, Saitama (JP)

(73) Assignees: Daido Metal Company Ltd., Aichi (JP); Honda Giken Kogyo Kabushiki Kaisha, Tokyo (JP)

(*) Notice: Subject to any disclaimer, the term of this patent is extended or adjusted under 35 U.S.C. 154(b) by 15 days.

(21) Appl. No.: 09/988,368

(22) Filed: Nov. 19, 2001

(65) Prior Publication Data

US 2002/0061147 A1 May 23, 2002

(30) Foreign Application Priority Data

Nov. 20, 2000 (JP) .......................................... 2000-352808

(51) Int. Cl.[7] .............................................. F16C 33/10
(52) U.S. Cl. ........................ 384/292; 384/288; 384/291
(58) Field of Search ................................ 384/114, 118, 384/120, 286, 287, 288, 289, 291, 292

(56) References Cited

U.S. PATENT DOCUMENTS

| | | | | | |
|---|---|---|---|---|---|
| 2,673,767 A | * | 3/1954 | Schoeppner | ................ | 384/291 |
| 2,901,297 A | * | 8/1959 | Sternlicht | ................... | 384/291 |
| 3,449,028 A | * | 6/1969 | De Hart | ..................... | 384/120 |
| 3,453,031 A | * | 7/1969 | Rickley et al. | ............. | 384/118 |
| 4,576,488 A | | 3/1986 | Steiner et al. | | |
| 4,620,804 A | | 11/1986 | Goyne | | |
| 4,883,367 A | | 11/1989 | Maruyama | | |
| 5,000,584 A | * | 3/1991 | Simmons | ..................... | 384/118 |
| 6,089,756 A | * | 7/2000 | Ono et al. | ................... | 384/322 |

FOREIGN PATENT DOCUMENTS

| | | |
|---|---|---|
| GB | 208900 | 1/1924 |
| GB | 1 545 369 | 5/1979 |
| GB | 2 350 652 | 12/2000 |
| JP | 6 147219 | 5/1994 |

* cited by examiner

Primary Examiner—Thomas R. Hannon
(74) Attorney, Agent, or Firm—Browdy & Neimark, P.L.L.C.

(57) ABSTRACT

A shaft bearing member for supporting a shaft so that the shaft is rotatable has an inner circumferential face serving as a sliding surface. The shaft bearing member includes an oil groove formed in the inner circumferential face so as to circumferentially extend, and a plurality of narrow grooves formed on the inner circumferential face so as to extend at a predetermined angle relative to a rotation direction of the shaft from at least one of both widthwise sides of the oil groove toward an axial end side of the inner circumferential face with respect to the shaft. The narrow grooves guide a lubrication oil from the oil groove toward the axial end side with rotation of the shaft. The narrow grooves are shallower and narrower than the oil groove.

8 Claims, 9 Drawing Sheets

SHAFT BEARING MEMBER

BACKGROUND OF THE INVENTION

1. Field of the Invention

This invention relates to a shaft bearing member having an oil groove formed in an inner circumferential face or sliding surface so as to circumferentially extend.

2. Description of the Related Art

Multiple cylinder engines for automobiles comprise a balance shaft provided in parallel with a crankshaft so as to be linked with the crankshaft in rotation so that vibration caused in the engine is reduced, for example. A plain bearing is usually used as a shaft bearing for bearing the balance shaft. Even if the balance shaft can reduce the vibration produced by the overall engine, the engine suffers a frictional loss due to the balance shaft with addition of a bearing for the balance shaft. Accordingly, provision of the bearing for the balance shaft becomes a disadvantageous condition. As a result, a reduction in the frictional loss in the bearing for the balance shaft has been desired.

SUMMARY OF THE INVENTION

Therefore, an object of the present invention is to provide a shaft bearing member which can reduce the frictional loss with rotation of the shaft.

The present invention provides a shaft bearing member for supporting a shaft so that the shaft is rotatable, the shaft bearing member having an inner circumferential face serving as a sliding surface. The shaft bearing member comprises an oil groove formed in the inner circumferential face so as to circumferentially extend, and a plurality of narrow grooves formed on the inner circumferential face so as to extend at a predetermined angle relative to a rotation direction of the shaft from at least one of both widthwise sides of the oil groove toward an axial end side of the inner circumferential face with respect to the shaft, the narrow grooves guiding a lubrication oil from the oil groove toward the axial end side with rotation of the shaft, the narrow grooves being shallower and narrower than the oil groove.

The lubrication oil supplied to the oil groove of the shaft bearing member flows through the oil groove onto the sliding surface with rotation of the shaft. An oil film pressure produced between the shaft and the sliding surface separates the shaft from the sliding surface. The inner circumferential face serving as the sliding surface has the plurality of narrow grooves formed thereon so as to extend at a predetermined angle relative to a rotation direction of the shaft from at least one of both widthwise sides of the oil groove toward an axial end side of the inner circumferential face with respect to the shaft. The narrow grooves guide a lubrication oil from the oil groove toward the axial end side with rotation of the shaft. The narrow grooves are shallower and narrower than the oil groove. Accordingly, the lubrication oil in the oil groove more easily tends to flow through the narrow grooves toward the axial end side of the sliding surface, thereby facilitating formation of oil film. Consequently, the frictional loss resulting from rotation of the shaft can be reduced since a direct contact between the shaft and the sliding surface is avoided.

To achieve the same object, the invention also provides a shaft bearing member for supporting a shaft so that the shaft is rotatable, the shaft bearing member having an inner circumferential face serving as a sliding surface. The shaft bearing member comprises an oil groove formed in the inner circumferential face so as to circumferentially extend, and a plurality of narrow grooves formed on the inner circumferential face so as to extend obliquely relative to a rotation direction of the shaft from both widthwise sides of the oil groove toward both axial ends of the inner circumferential face, the narrow grooves guiding a lubrication oil from the oil groove toward the axial end side with rotation of the shaft, the narrow grooves being shallower and narrower than the oil groove. In this construction, too, the inner circumferential face serving as the sliding surface has the plurality of narrow grooves formed thereon to extend from both widthwise sides of the oil groove toward both axial ends of the inner circumferential face obliquely relative to the direction of rotation of the shaft, the narrow grooves introducing the lubrication oil from the oil groove toward the axial end side with rotation of the shaft, the narrow grooves being shallower and narrower than the oil groove. Accordingly, the lubrication oil in the oil groove more easily tends to flow through the narrow grooves toward the axial end side of the sliding surface, thereby facilitating formation of oil film.

In a first preferred form, the shaft bearing member further includes a portion where no narrow groove is formed, said portion being located near the axial end of the inner circumferential face. Consequently, the shaft can be supported well since the oil film is desirably formed on the portion of the shaft bearing member where no narrow groove is formed.

In a second preferred form, the shaft bearing member further includes an escape portion formed near the axial end of the inner circumferential face so as to retreat radially outward. When the shaft swings with an axial inclination, there is a possibility that the shaft may locally contact both axial ends of the shaft bearing member. In view of this local contact, when the escape portion is formed near the axially outer end of the inner circumferential face, an occurrence of the local contact between the shaft and sliding surface can be prevented.

In a third preferred form, the shaft bearing member is formed into a generally semicylindrical shape and has the plurality of narrow grooves in a circumferentially central portion of the inner circumferential face thereof and portions where no narrow groove is formed, said portions being located near both circumferential ends of the inner circumferential face thereof respectively. When two semicylindrical shaft bearing members are combined together into a cylindrical bearing shaft member, the lubrication oil disadvantageously tends to flow out of the circumferential ends. However, since no narrow grooves are formed in the portions located near both circumferential ends, the lubrication oil can be prevented from flowing out of the circumferential ends.

BRIEF DESCRIPTION OF THE DRAWINGS

Other objects, features and advantageous of the present invention will become clear upon reviewing of the following description of embodiments, made with reference to the accompanying drawings, in which.

DETAILED DESCRIPTION OF EMBODIMENTS

Figure 3:
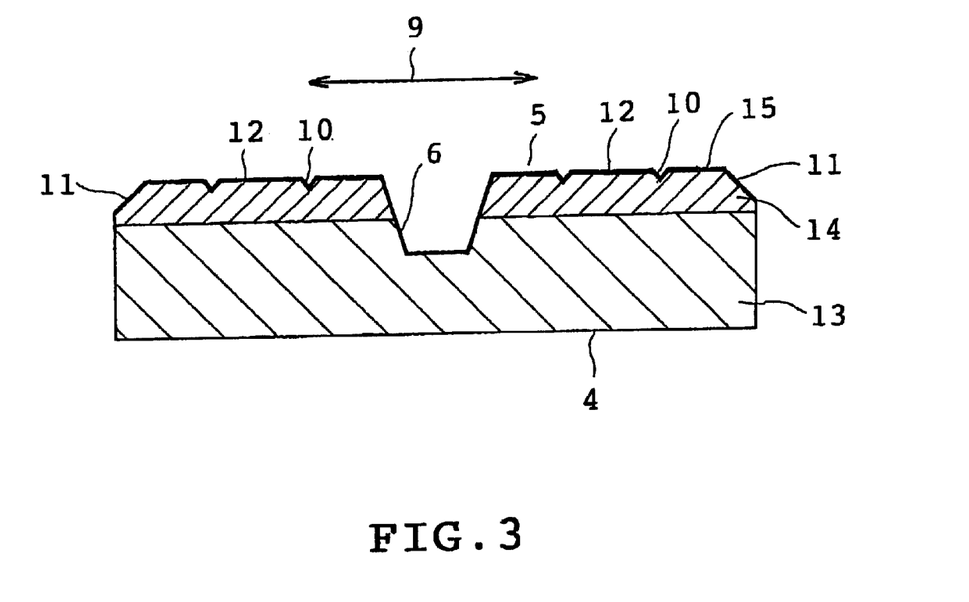
FIG. 3 is a typical sectional view taken along line 3—3 in FIG. 1.
Figure 4:
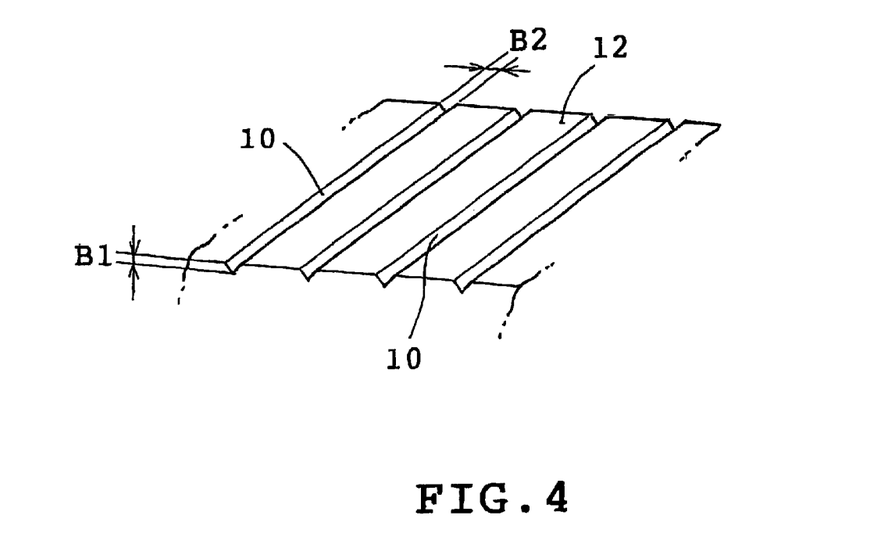
FIG. 4 is an enlarged perspective view of a part of the inner circumferential face of the bearing.
Figure 5:
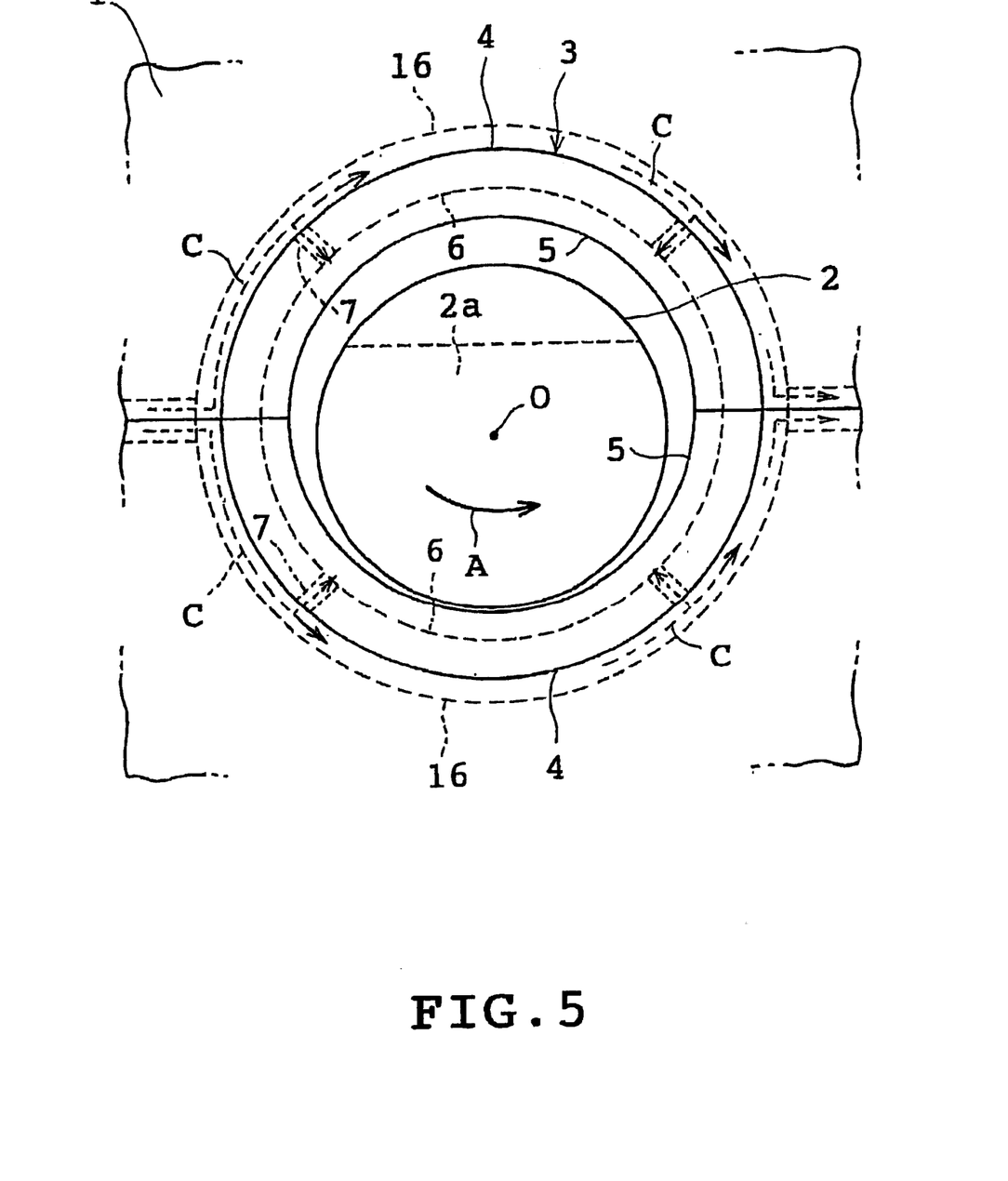
FIG. 5 is a front view of the bearing supporting a balance shaft.

A first embodiment of the invention will be described with reference to FIGS. 1 to 5. In the first embodiment, the invention is applied to a balancer bearing for supporting a balance shaft of an automobile engine. Referring first to FIG. 5, a housing 1 for the automobile engine is shown. A plain bearing 3 is provided on the housing 1 and constitutes a shaft bearing member for supporting a balance shaft 2 serving as a shaft. The housing 1 is divided into upper and lower parts. The balance shaft 2 includes an unbalanced portion 2a having a substantially semicircular section and formed Into a semicylindrical shape. The balance shaft 2 is rotated about the center of rotation O.

Figure 1:
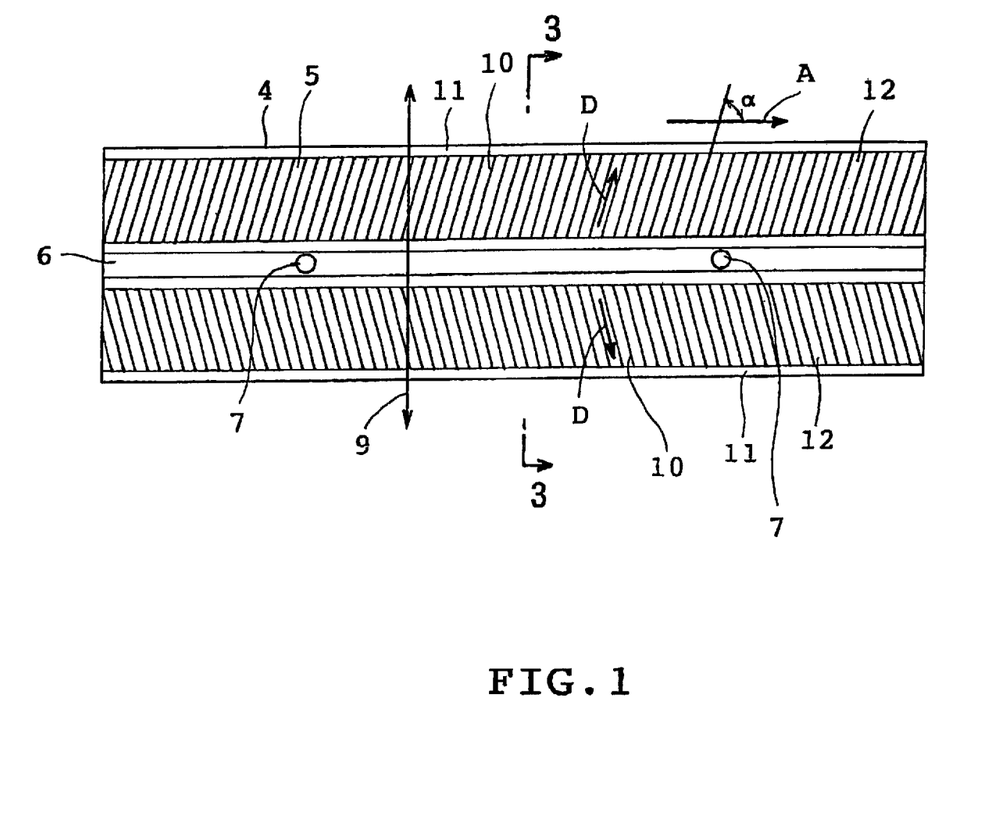
FIG. 1 is a developed view of the inner circumferential side of a semicylindrical bearing of a first embodiment in accordance with the invention.
Figure 2A:
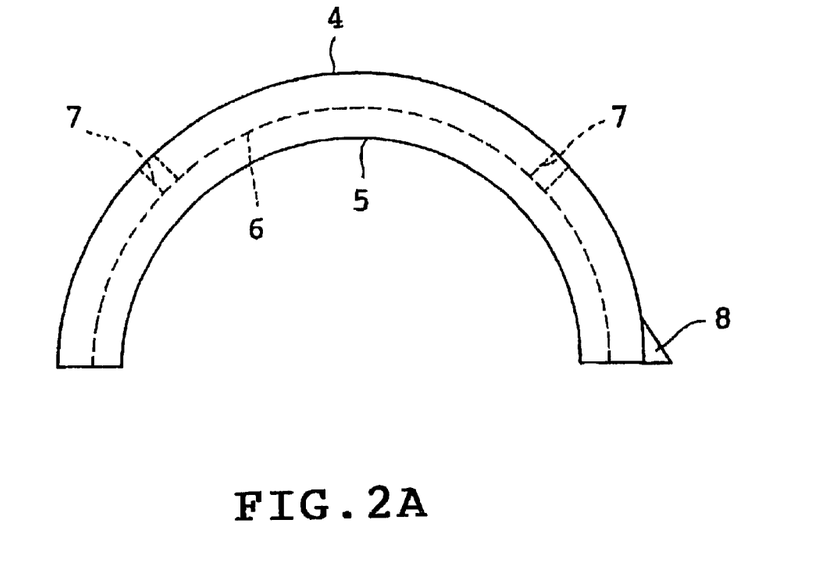
FIGS. 2A and 2B are a front view of the semicylindrical bearing and a plan view of the inner circumferential side respectively.
Figure 2B:
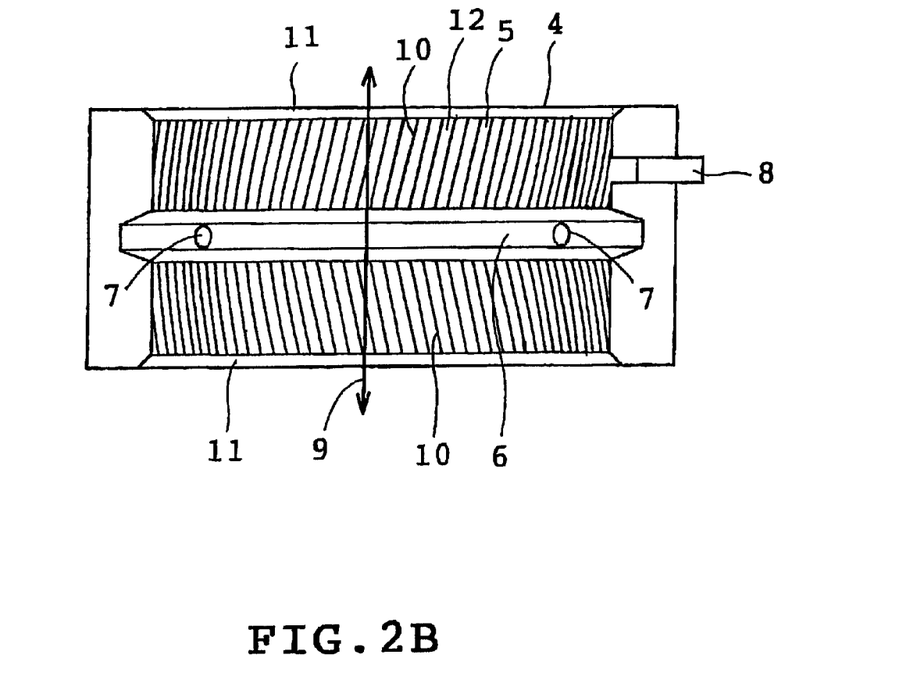

The plain bearing 3 includes two bearing halves 4 butted against each-other into a cylindrical shape. Each bearing half 4 has a generally semicylindrical section and includes an oil groove 6 formed in an inner circumferential face 5 serving as a sliding surface so as to circumferentially extend, two lubrication holes 7 each open at a bottom of the oil groove 6 in a circumferential wall, and a lug 8 formed on a circumferential end, as shown in FIGS. 1 and 2.

A plurality of narrow grooves 10 are formed on the inner circumferential face 5 of each bearing half 4 to extend obliquely at a predetermined angle relative to a rotation direction of the shaft from both widthwise sides of the oil groove 6 toward both axial ends of the inner circumferential face. The narrow grooves 10 are shallower and narrower than the oil groove 6. Two chamfers 11 are formed on the both axial ends respectively. A portion formed with each narrow groove 10 is a flat surface 12 which is parallel with the axis 9 (balance shaft 2), as shown in FIG. 3. Each narrow groove 10 is generally linear and inclined at an angle of α relative to the rotation direction A of the shaft, for example, about 60 degrees in the embodiment. Further, each narrow groove 10 preferably has a depth B1 ranging between 3 and 50 μm and a width B2 ranging between 5 and 100 μm, as shown in FIG. 4. The angle α may be larger than 90 degrees, and a holding performance of the lubrication oil is improved when the angle α is larger than 90 degrees.

Each bearing half 4 has a three-layer structure including a back metal 13, a bearing alloy 14 and an overlay 15, as shown in FIG. 3. The surfaces of the oil groove 6, flat faces 12 and chamfers 11 are covered with the overlay 15. The overlay 15 may be made from any one of systems of lead (Pb), tin (Sn) and resin. The housing 1 provided with the foregoing plain bearing 3 has an oil passage 16 through which the lubrication oil is supplied, as shown in FIG. 5. The lubrication oil is supplied through the oil passage 16 and lubrication holes 7 into the oil groove 6 as shown by arrows C in FIG. 5.

The lubrication oil supplied to the oil groove 6 of the plain bearing 3 flows onto the sliding surface with rotation of the balance shaft 2. An oil film pressure produced between the balance shaft 2 and the sliding surface separates the shaft from the sliding surface. The inner circumferential face 5 serving as the sliding surface has a plurality of shallow narrow grooves 10 formed therein to extend obliquely relative to the rotation direction A of the shaft from both widthwise sides of the oil groove 6 toward both end sides of the inner circumferential face 5 in the direction of the axis 9. Accordingly, the lubrication oil in the oil groove 6 more easily tends to flow through the narrow grooves 10 toward both end sides of the inner circumferential face 5 in the direction of the axis 9 as shown by arrows D in FIG. 1, thereby facilitating formation of oil film. Consequently, the frictional loss resulting from rotation of the balance shaft 2 and accordingly fuel consumption of the engine can be reduced since a direct contact between metals, namely, between the balance shaft 2 and the sliding surface of the plain bearing 3 is prevented in a range of practical rotational speed of the balance shaft 2.

The inner circumferential face 5 of each bearing half 4 is covered with the overlay 15. The inner circumferential face 5 has unavoidable slight roughness due to machining. However, since the face 5 is covered with the overlay 15 in the embodiment, the face 5 is apt to be conformed to the balance shaft 2, whereupon the frictional loss can further be reduced.

Additionally, two bearing halves 4 are butted against each other into the circular cylindrical plain bearing 3. Consequently, the narrow grooves 10 and the like can easily be formed on the inner circumferential face 5 of each bearing half 4.

Figure 6:
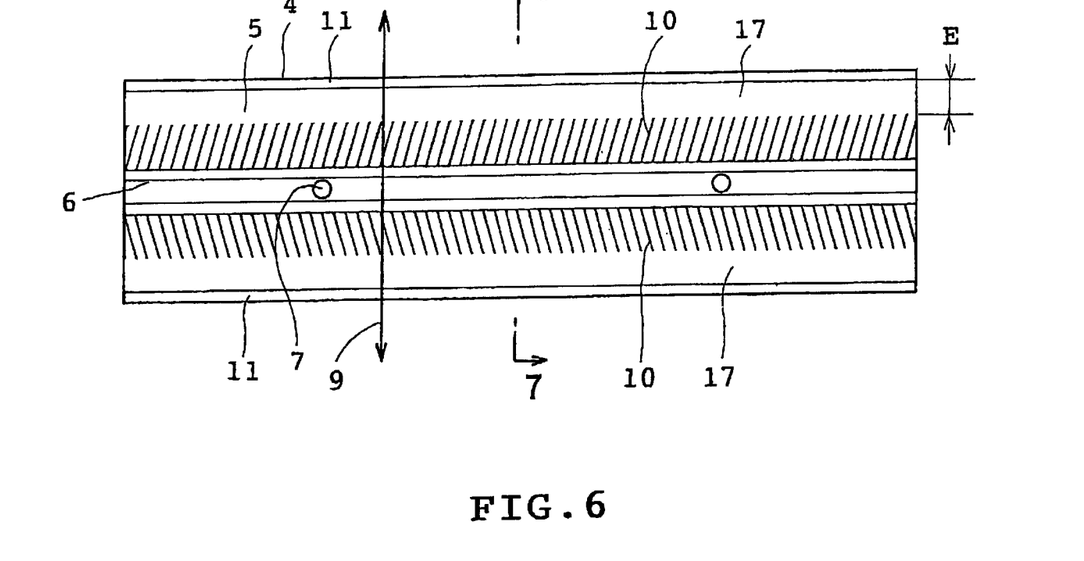
FIG. 6 is a view similar to FIG. 1 showing the semicylindrical bearing of a second embodiment in accordance with the invention.
Figure 7:
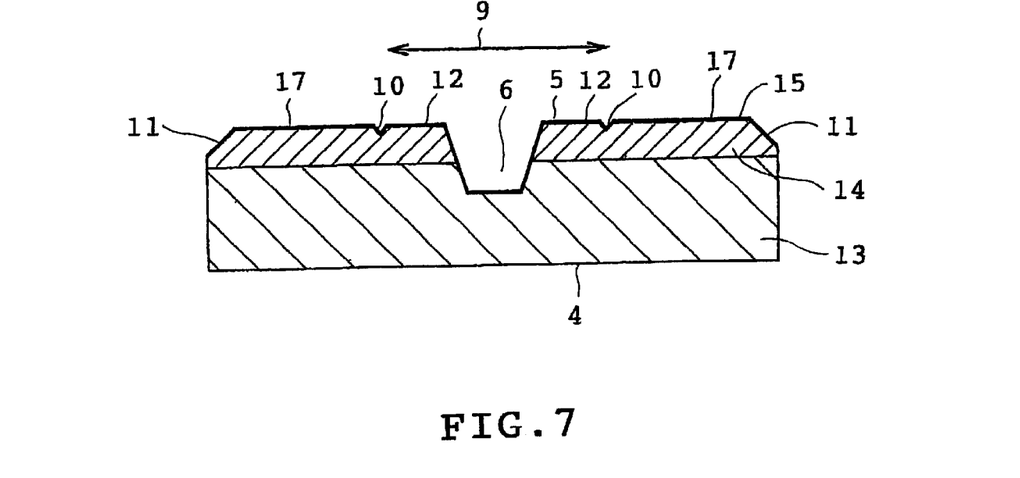
FIG. 7 is a view similar to FIG. 3, showing the section taken along line 7—7 in FIG. 6.

FIGS. 6 and 7 illustrate a second embodiment of the invention. The inner circumferential face 5 of each bearing half 4 has two flat faces 17 formed near the end sides of the inner circumferential face 5 in the direction of the axis 9 respectively. Each flat face 17 constitutes a portion where no narrow groove 10 is formed. Each flat face 17 extends from one of both circumferential ends of the bearing half 4 to the other end and has a width E of about 3 mm. The oil film is satisfactorily formed between the flat faces 17 and the balance shaft 2 in the above-described construction. Consequently, the balance shaft 2 can be supported sufficiently.

Figure 8:
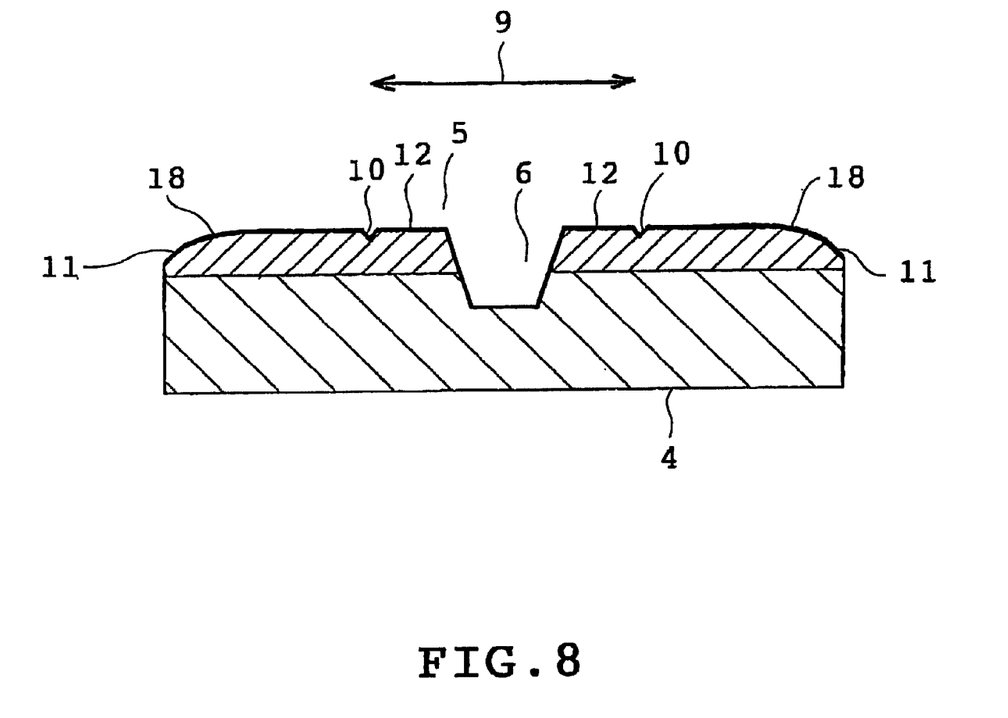
FIG. 8 is a view similar to FIG. 7, showing the semicylindrical bearing of a third embodiment in accordance with the invention.

FIG. 8 illustrates a third embodiment of the invention. The third embodiment differs from the second embodiment in that two escape portions 18 are formed near the axially outer end on the inner circumferential face so as to retreat radially outward from the flat faces 12. Each escape portion 18 has a maximum depth of about 20 μm and is formed using a crowning processing with a curved surface. Each escape portion 18 has no narrow grooves 10.

An oil film pressure by squeeze effect refers to an oil film produced between a shaft and a sliding surface by a sudden radial movement of the shaft. An oil film pressure by wedge effect refers to an oil film produced when rotation of a shaft supported by the bearing draws a lubrication oil between the shaft and the sliding surface. The oil film by squeeze effect is not expected when a rotational inertia force of the balance shaft 2 acts as a load. Accordingly, the oil film by wedge effect needs to be ensured. For this purpose, a ratio of the width to the radius of the plain bearing 3 or each bearing half 4 is in most cases large.

In this case, when the balance shaft 2 swings with an inclination in the direction of axis 9 during acceleration or deceleration of the engine, there is a possibility that the balance shaft 2 may locally contact both ends of the plain bearing 3 in the direction of axis 9. In the embodiment, however, the escape portion 18 is formed in the outer end of each flat face 12 in the direction of axis 9, whereupon an occurrence of the local contact between the balance shaft 2 and sliding surface can be prevented. Consequently, the frictional loss can further be reduced.

Figure 9:
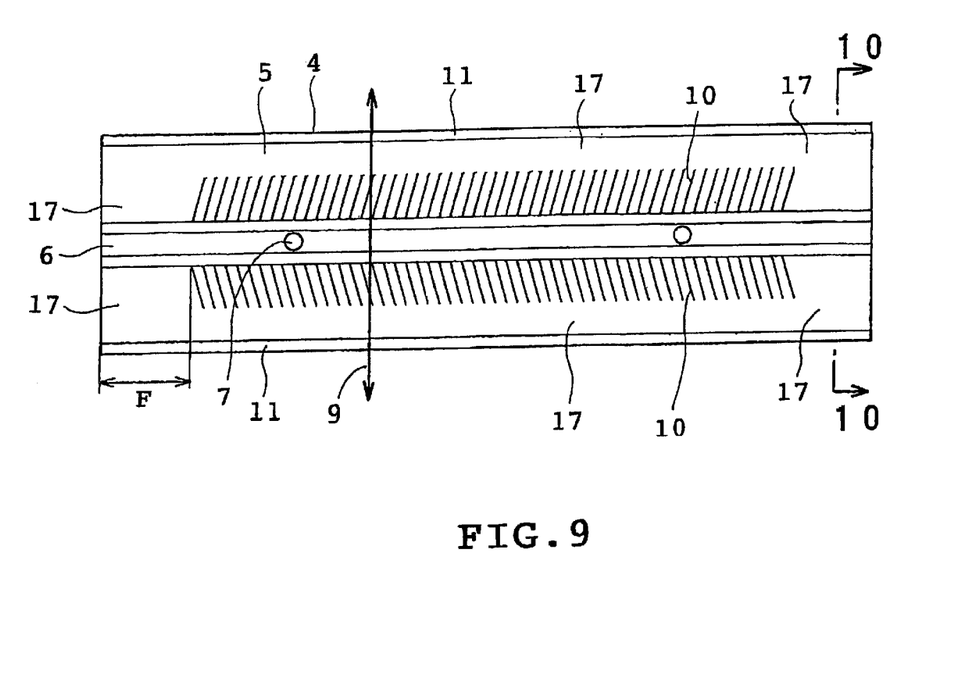
FIG. 9 is a view similar to FIG. 1, showing the semicylindrical bearing of a fourth embodiment in accordance with the invention.
Figure 10:
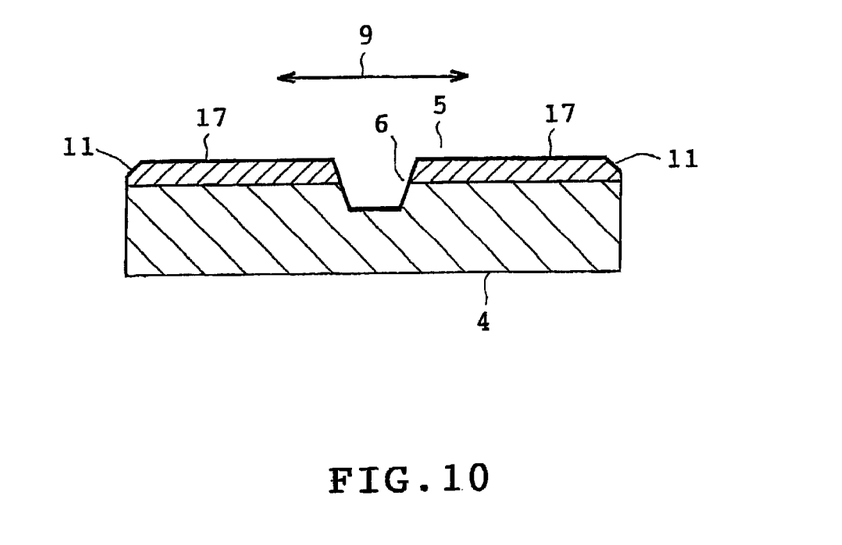
FIG. 10 is a view similar to FIG. 3, showing the section taken along line 10—10 in FIG. 9.

FIGS. 9 and 10 illustrate a fourth embodiment of the invention. The fourth embodiment differs from the second embodiment in that no narrow groove 10 is formed near the circumferential ends on the inner circumferential face 5 of each bearing half 4. The portions of the face 5 near the circumferential ends serve as flat faces 17 in parallel to the balance shaft 2. Each flat face 17 includes a circumferential region F which is at an angle of about 20 degrees and larger than a crash relief. Consequently, an amount of leakage of lubrication oil can be reduced and an efficiency in forming the narrow grooves 10 can be improved.

When the two bearing halves 4 are combined together into a cylindrical plain bearing 3, the lubrication oil disadvantageously tends to flow through the narrow grooves 10 out of the circumferential ends of the plain bearing 3. In the embodiment, however, since the portions located near both circumferential ends have no narrow grooves 10 and serve as the flat faces 17, the lubrication oil can be prevented from flowing out of the circumferential ends.

Figure 11:
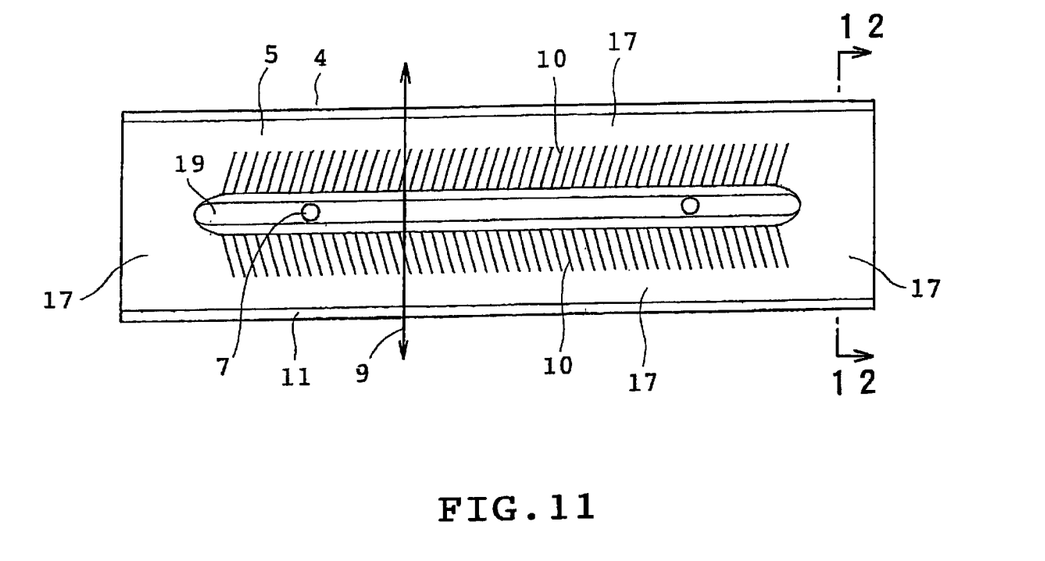
FIG. 11 is a view similar to FIG. 1, showing the semicylindrical bearing of a fifth embodiment in accordance with the invention.
Figure 12:
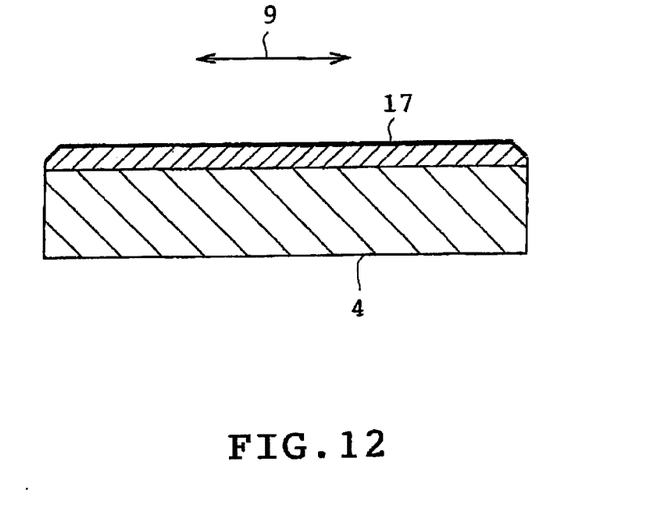
FIG. 12 is a view similar to FIG. 3, showing the section taken along line 11—11 in FIG. 11.

FIGS. 11 and 12 illustrate a fifth embodiment of the invention. The fifth embodiment differs from the fourth embodiment in that the oil groove 19 does not extend to both circumferential ends of the inner circumferential face 5 of each bearing half 4.

Figure 13:
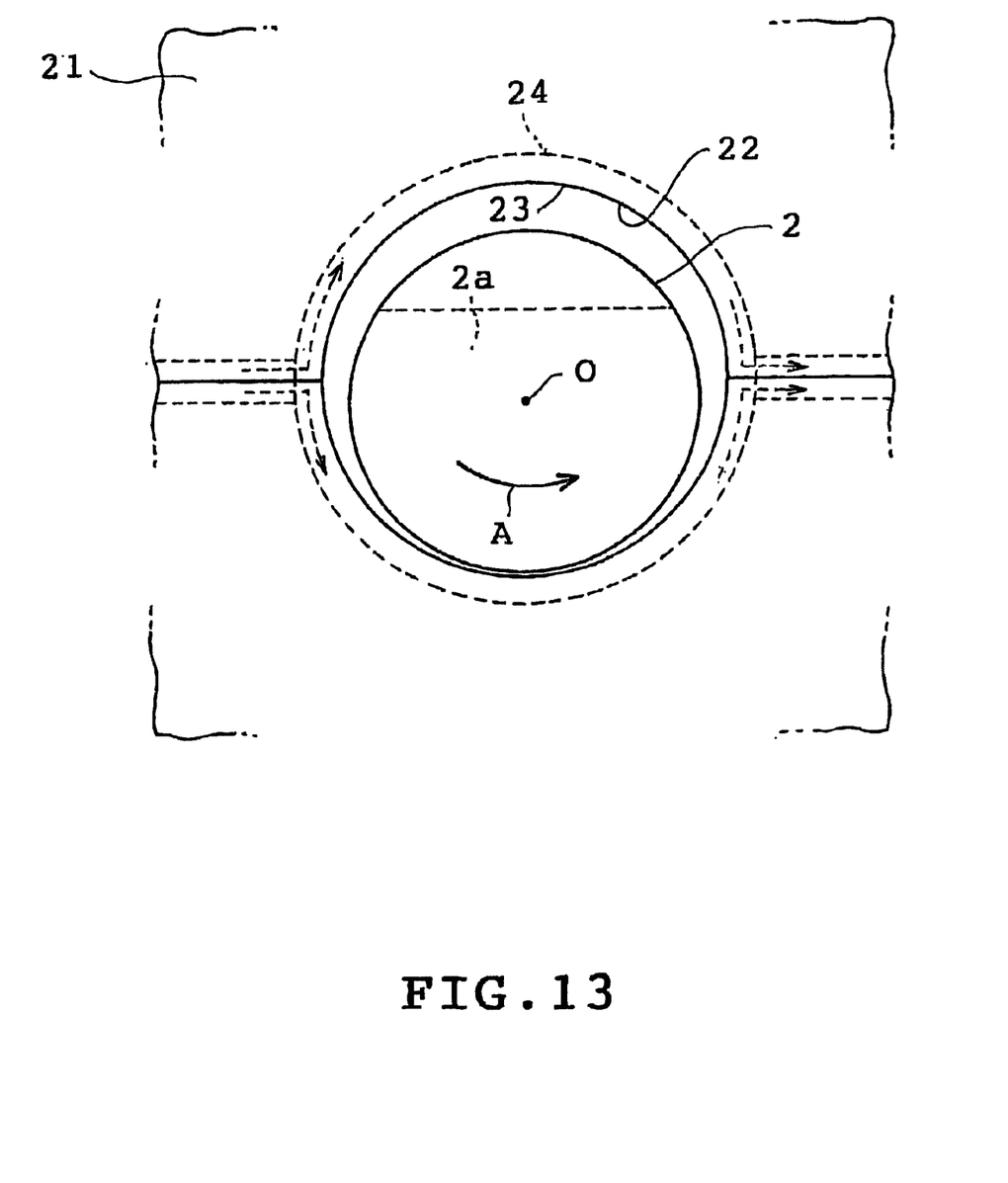
FIG. 13 is a view similar to FIG. 5, showing the semicylindrical bearing of a sixth embodiment in accordance with the invention.

FIG. 13 illustrates a sixth embodiment of the invention. In the sixth embodiment, no discrete plain bearing is provided on a housing 21 of the engine. The balance shaft 2 is directly supported in a circular hole 22 formed in the two-piece housing 21. Thus, the housing 21 constitutes the shaft supporting member supporting the balance shaft 2. The inner circumferential face 23 of the hole 22 serving as the sliding surface is formed with the circumferentially extending oil groove 24 and the narrow grooves 10 etc. Which are substantially the same as those in the first embodiment.

The narrow grooves 10 may be formed in at least one of both widthwise sides of the oil groove 6. The aforesaid angle α may be 90 degrees. The narrow grooves 10 may be curved although linear in the foregoing embodiments.

The plain bearing 3 and the housing 21 may be applied to cases where shafts other than the balance shaft 2 are received. The sliding shaft 3 may singly constitute a cylindrical member. Each bearing half 4 may have a double-layer structure including the bearing alloy and overlay or a single-layer structure of the bearing alloy other than the three-layer structure.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A shaft bearing member for supporting a shaft so that the shaft is rotatable, the shaft bearing member having an inner circumferential face serving as a sliding surface, the shaft bearing member comprising:
    an oil groove formed in the inner circumferential face so as to circumferentially extend; and
    a plurality of narrow grooves formed on the inner circumferential face so as to extend at a predetermined angle relative to a rotation direction of the shaft from at least one of both widthwise sides of the oil groove toward an axial end side of the inner circumferential face with respect to the shaft, the narrow grooves guiding a lubrication oil from the oil groove toward the axial end side with rotation of the shaft, the narrow grooves being shallower and narrower than the oil groove.

2. A shaft bearing member according to claim 1, which further includes a portion where no narrow groove is formed, said portion being located near the axial end of the inner circumferential face.

3. A shaft bearing member according to claim 1, which further includes an escape portion formed near the axial end of the inner circumferential face so as to retreat radially outward.

4. A shaft bearing member according to claim 1, which is formed into a generally semicylindrical shape and has the plurality of narrow grooves in a circumferentially central portion of the inner circumferential face thereof and portions where no narrow groove is formed, said portions being located near both circumferential ends of the inner circumferential face thereof respectively.

5. A shaft bearing member for supporting a shaft so that the shaft is rotatable, the shaft bearing member having an inner circumferential face serving as a sliding surface, the shaft bearing member comprising:
    an oil groove formed in the inner circumferential face so as to circumferentially extend; and
    a plurality of narrow grooves formed on the inner circumferential face so as to extend obliquely relative to a rotation direction of the shaft from both widthwise sides of the oil groove toward both axial ends of the inner circumferential face, the narrow grooves guiding a lubrication oil from the oil groove toward the axial end side with rotation of the shaft, the narrow grooves being shallower and narrower than the oil groove.

6. A shaft bearing member according to claim 5, which further includes portions where no narrow groove is formed, said portions being located near the axial ends of the inner circumferential face respectively.

7. A shaft bearing member according to claim 5, which further includes an escape portion formed near the axial end of the inner circumferential face so as to retreat radially outward.

8. A shaft bearing member according to claim 5, which is formed into a generally semicylindrical shape and has the plurality of narrow grooves in a circumferentially central portion of the inner circumferential face thereof and portions where no narrow groove is formed, said portions being located near both circumferential ends of the inner circumferential face thereof respectively.

* * * * *